(12) United States Patent
Masuda et al.

(10) Patent No.: US 9,973,015 B2
(45) Date of Patent: May 15, 2018

(54) BATTERY CELL WITH A RAPID DISCHARGE UNIT AND RAPID DISCHARGE METHOD FOR SUCH A BATTERY CELL

(71) Applicant: Lithium Energy and Power GmbH & Co. KG, Stuttgart (DE)

(72) Inventors: Hideki Masuda, Osaka (JP); Yutaro Katsumata, Kyoto (JP); Marcel Wilka, Kyoto (JP); Marco Friedrich, Ludwigsburg (DE); Stephan Leuthner, Leonberg (DE); Cornelius Liebenow, Stuttgart (DE); Yuji Ashida, Stuttgart (DE); Shunsuke Mizutani, Hyogo Prefecture (JP); Daisuke Konishi, Stuttgart (DE); Shinya Kitano, Stuttgart (DE)

(73) Assignee: Lithium Energy and Power GmbH & Co. KG, Stuttgart (DE)

( * ) Notice: Subject to any disclaimer, the term of this patent is extended or adjusted under 35 U.S.C. 154(b) by 17 days.

(21) Appl. No.: 15/341,457

(22) Filed: Nov. 2, 2016

(65) Prior Publication Data

US 2017/0133872 A1    May 11, 2017

(30) Foreign Application Priority Data

Nov. 5, 2015 (EP) .................................. 15193294

(51) Int. Cl.
| | |
|---|---|
| *H02J 7/00* | (2006.01) |
| *H02J 7/04* | (2006.01) |
| *H02J 7/16* | (2006.01) |
| *H01M 10/42* | (2006.01) |
| *H01M 10/44* | (2006.01) |
| *H01M 2/30* | (2006.01) |
| *H01M 2/14* | (2006.01) |

(52) U.S. Cl.
CPC ............ *H02J 7/0063* (2013.01); *H01M 2/14* (2013.01); *H01M 2/30* (2013.01); *H01M 10/4257* (2013.01); *H01M 10/44* (2013.01); *H02J 7/0029* (2013.01); *H01M 2010/4271* (2013.01); *H02J 2007/0067* (2013.01)

(58) Field of Classification Search
CPC ....................................................... H02J 7/0091
USPC ......................................................... 320/136
See application file for complete search history.

(56) References Cited

U.S. PATENT DOCUMENTS

| 8,994,332 B2 * | 3/2015 | Xu ..................... H01M 10/5006 320/107 |
| 2012/0094152 A1 * | 4/2012 | Wu ..................... H01M 10/052 429/50 |

* cited by examiner

*Primary Examiner* — Edward Tso
*Assistant Examiner* — Ahmed Omar
(74) *Attorney, Agent, or Firm* — Michael Best & Friedrich LLP

(57) ABSTRACT

A battery cell (10) with two battery cell terminals (11, 12) which are contactable from inside and/or outside the battery cell (10), and an electrochemical part (20) comprising at least one separator. Upon the achievement of a predefined temperature, the at least one separator is at least partially impermeable to ions which can be generated in the electrochemical part (20). The battery cell (10) has a rapid discharge unit (30), which is connectable between the battery cell terminals (11, 12) and which, in a switched-in and consequently activated state, has a predefined resistance value. The predefined resistance value is selected such that, with the rapid discharge unit (30) switched-in, the at least one separator achieves the predefined temperature.

9 Claims, 2 Drawing Sheets

BATTERY CELL WITH A RAPID DISCHARGE UNIT AND RAPID DISCHARGE METHOD FOR SUCH A BATTERY CELL

BACKGROUND OF THE INVENTION

The present invention relates to a battery cell with two battery cell terminals which are contactable from inside and/or outside the battery cell, and an electrochemical part configured, for example, as a jelly roll, which comprises a plurality of electrodes and at least one separator. Upon the achievement of a predefined temperature, the at least one separator is at least partially impermeable to ions which can be generated in the electrochemical part. The present invention also relates to a rapid discharge method for a battery cell of this type. The invention also relates to a battery system with a battery having at least one such battery cell.

It is known that, in the event of a defect or in response to excessive loading, a battery cell can exhibit critical or hazardous behavior. Such behavior can include thermal runaway in the battery cell, initiated by an exothermic reaction in the interior of the battery cell, degassing of the battery cell, the occurrence of fire in the battery cell and/or even the explosion of the battery cell. A battery cell configured as an electrochemical energy store comprises an electrochemical part which is configured, for example, in the form of a jelly roll.

SUMMARY OF THE INVENTION

According to the invention, a battery cell is provided with two battery cell terminals which are contactable from inside and/or outside the battery cell, and an electrochemical part configured, for example, as a jelly roll. The electrochemical part comprises a plurality of electrodes and at least one separator. Upon the achievement of a predefined temperature, the at least one separator is at least partially impermeable to ions which can be generated in the electrochemical part. The battery cell according to the invention has a rapid discharge unit, which is connectable between the battery cell terminals and has a predefined resistance value. The predefined resistance value is selected such that, when the rapid discharge unit is brought into circuit, the at least one separator achieves the predefined temperature. The at least one separator achieves the predefined temperature, in the absence of a short-circuit path in the interior of the battery cell, within a predefined first time interval. Moreover, the at least one separator achieves the predefined temperature, in the presence of a short-circuit path in the interior of the battery cell, within a predefined second time interval. The first and second time intervals commence respectively upon the switching-in of the rapid discharge unit, and end respectively upon the achievement of the predefined temperature.

It is preferred that the duration of the first time interval should be equal to the duration of the second time interval.

In the aforementioned battery cell, it is advantageously provided that a discharge current with a high current value flowing through the rapid discharge unit results in the heat-up of the entire battery cell which, in turn, leads to the at least partial deactivation of the at least one separator within the first or second time interval. The magnitude of the current value of the discharge current flowing through the rapid discharge unit is determined by the selection of the predefined resistance value. The at least partial deactivation of the at least one separator can be initiated in a hazard situation during which, for example, a short-circuit path has appeared or might appear in the interior of the battery cell, and in which the battery cell might, as a result, assume a critical or hazardous behavior. Behavior of this type can include thermal runaway of the battery cell. Deactivation of the at least one separator is achieved wherein the latter, within the first or second time intervals, achieves the predefined temperature, and consequently becomes at least partially impermeable to the ions which can be generated in the electrochemical part. By this arrangement, in the event of a hazard situation, the current value of a discharge current generated by the battery cell, and consequently the further heat-up of the battery cell, can be reduced. Accordingly, during the hazard situation, the occurrence of critical or hazardous behavior by the battery cell, specifically the thermal runaway thereof, can be prevented. If, for example, the at least one separator, upon the achievement of the predefined temperature over a partial surface which corresponds to 85% of its total surface, becomes impermeable to the aforementioned ions, the current value of the discharge current generated by the battery cell, given a battery cell capacity of approximately 40 Ah, will typically be equal to or lower than 100 A. If the at least one separator, upon the achievement of the predefined temperature over its entire surface, becomes impermeable to the aforementioned ions, the current value of the discharge current generated by the battery cell will be reduced to 0 A. In both cases, the electrodes of the electrochemical part are mutually electrically isolated by the at least one separator.

In a battery cell of the aforementioned type, which comprises two battery cell terminals which are contactable from inside and/or outside the battery cell, the two battery cell terminals can be configured as part of a battery cell housing of the battery cell. Moreover, the rapid discharge unit can be arranged inside or outside the battery cell housing, or can be configured as part of the battery cell housing.

According to a preferred first further development of the invention, the predefined resistance value is selected such that, in the absence of a short-circuit path, a first quantity of electrical energy undershoots a first energy limit. The first quantity of energy thus coincides with a quantity of energy which, in the absence of a short-circuit path, as a result of a discharge current flowing through the rapid discharge unit during a variable third time interval, is converted into heat. The third time interval commences simultaneously with the first time interval, and has a maximum duration which is equal to or greater than the duration of the first time interval.

In the aforementioned battery cell, the first energy limit is preferably selected such that overheating of the entire battery, thus initiating the thermal runaway of the battery cell, can only occur in the event of the overshoot thereof by the first quantity of energy.

In the aforementioned battery cell, the at least one separator is preferably provided with at least one ceramic coating.

According to a preferred second further development of the invention, which can be combined with the first preferred further development and/or with configurations thereof, the aforementioned battery cell incorporates a control unit. The control unit is designed to switch-in the rapid discharge unit within a fourth predefined time interval. The fourth time interval commences immediately after the detection of a hazard situation, in which a short-circuit path has appeared or might appear in the interior of the battery cell, or in which a high risk of an aforementioned critical behavior by the battery cell is anticipated. Moreover, the fourth time interval ends upon the switching-in of the rapid discharge unit.

In the aforementioned battery, where the rapid discharge unit is switched-in and/or in the presence of a short-circuit path, the discharge current generated by the battery cell is preferably equal to the maximum discharge current which can be generated by the corresponding battery cell.

The aforementioned battery cell, in which the rapid discharge unit is switched-in in the presence of a short-circuit path, has an advantage in that a rapid discharge path is generated, which is switched-in in parallel to the short-circuit path. The discharge current generated by the battery cell is thus divided between the short-circuit path and the rapid discharge path, and consequently does not flow in its entirety through the short-circuit path. This means that, in the presence of the short-circuit path and with the rapid discharge unit switched-in, the discharge current generated by the battery cell is equal to the sum of a discharge current flowing through the rapid discharge unit and a discharge current flowing in the short-circuit path. Accordingly, by the switching-in of the rapid discharge unit, the current value of the discharge current flowing in the short-circuit current path is reduced, thereby preventing any overheating of the region of the battery cell in which the short-circuit path is present. At the same time, the discharge current flowing through the rapid discharge unit results in the heat-up of the entire battery cell such that, in turn, the at least one separator, and consequently also the battery cell, are at least partially deactivated within the second predefined time interval.

An aforementioned hazard situation can arise as a result of damage to an aforementioned battery cell which can occur, for example, in the event of an accident or an unusually substantial mechanical impact. An impact of this type can be caused, for example, by the falling, jolting or collision of the battery cell. An aforementioned hazard situation can also arise as a result of the excessive loading of an aforementioned battery cell, or as a result of an electrical fault occurring therein which is caused, for example, by a short-circuit in the interior of the corresponding battery cell.

According to a preferred third further development of the invention, which can be combined with one or more of the aforementioned further developments and/or with configurations thereof, an aforementioned hazard situation can occur during a safety test of an aforementioned battery cell, or during the operation thereof.

According to a preferred fourth further development of the invention, which can be combined with one or more of the aforementioned further developments and/or with configurations thereof, a short-circuit path is formed in the interior of the aforementioned battery cell during the safety test by the penetration of the corresponding battery cell with a nail.

According to a preferred fifth further development of the invention, which can be combined with one or more of the aforementioned further developments and/or with configurations thereof, the electrochemical part is configured, and the aforementioned battery cell is preferably dimensioned such that a second and third quantity of electrical energy undershoot a second energy limit respectively. Alternatively or additionally, a sum of the second and third quantities of energy undershoots a third energy limit. The second and third quantities of energy, and/or the sum thereof, thus undershoot the corresponding energy limit if, in the presence of a short-circuit path, the duration of the fourth time interval undershoots a time limit and the predefined resistance value undershoots a limiting value for resistance. The second quantity of energy coincides with a quantity of energy which, in the presence of a short-circuit path and as a result of a discharge current flowing in the short-circuit path during a variable fifth time interval, is converted into heat. The third quantity of energy coincides with a quantity of energy which, in the presence of a short-circuit path and as a result of a discharge current flowing in the rapid discharge unit during the fifth time interval, is converted into heat. The fifth time interval commences simultaneously with the second time interval, and has a maximum duration which is equal to or greater than the duration of the second time interval.

According to a preferred sixth further development of the invention, which can be combined with one or more of the aforementioned further developments and/or with configurations thereof, the second energy limit is lower than the third energy limit. Alternatively or additionally, the third energy limit is equal to or lower than the first energy limit.

In an aforementioned battery cell, the second energy limit is preferably selected such that the overheating of the battery cell region in which the short-circuit path is located, thereby initiating the thermal runaway of the battery cell, can only occur in the event of the overshoot thereof by the second and/or third quantity of energy. In an aforementioned battery cell, moreover, the third energy limit is preferably selected such that the overheating of the entire battery cell, thus initiating the thermal runaway of the battery cell, can only occur in the event of the overshoot thereof by the sum of the second and third quantities of energy.

The aforementioned battery cell, in which the first quantity of energy undershoots the first energy limit, has an advantage in that the overheating of the entire corresponding battery cell, thus initiating the thermal runaway of the battery cell, is prevented. Moreover, any shrinkage or decomposition of the at least one separator associated with any such overheating, and consequently any short-circuit in the interior of the battery cell resulting from the shrinkage or decomposition of the at least one separator, is also prevented. The same advantage also applies to an aforementioned battery cell, in which the sum of the second and third quantities of energy undershoots the third energy limit.

The aforementioned battery cell, in which the second and third quantities of energy undershoot the second energy limit respectively, has an advantage in that the overheating of the region of the battery cell in which the short-circuit path is located, thus initiating the thermal runaway of the corresponding battery cell, is prevented.

An aforementioned battery cell is preferably a prismatic battery cell, or a pouch cell, or a cylindrical cell, or a battery cell of a different mechanical format. An aforementioned battery cell, moreover, is preferably a lithium-ion battery cell and/or a battery cell for use in automotive applications and/or in stationary energy stores.

In an aforementioned battery cell, a current value of the maximum discharge current which can be delivered by the corresponding battery cell and/or a current value of the discharge current flowing in the switched-in rapid discharge unit lies within a range of values which, for an exemplary battery capacity of 40 Ah, ranges from $5 \cdot 10^3$ A to $10 \cdot 10^3$ A.

In an aforementioned battery cell, which is a lithium-ion battery cell with an exemplary battery capacity of 40 Ah, the predefined resistance value of the rapid discharge unit can be equal to or lower than $1 \cdot 10^{-4} \Omega$ or $1 \cdot 10^{-3} \Omega$, or can lie within a range of values which extends from $1 \cdot 10^{-4} \Omega$ to $1 \cdot 10^{-3} \Omega$.

In an aforementioned battery cell, which is a prismatic battery cell for use in automotive applications or in stationary energy stores and has an exemplary battery capacity of 40 Ah, the duration of the first and/or second time interval, during which the at least one separator achieves the predefined temperature, lies within a range of values which extends from 20 s to 30 s. In such a case, the duration of the first and/or second time interval preferably has a value of 30 s.

In an aforementioned battery cell with an exemplary battery capacity of 40 Ah, in which the duration of the fourth time interval undershoots the time limit, the time limit can be equal to or lower than $250.10^{-3}$ s. In this case, the duration of the fourth time interval can assume, for example, a value of $100.10^{-3}$ s.

Preferably, the current value of the maximum discharge current which can be generated by an aforementioned battery cell and/or a current value of the discharge current flowing in the switched-in rapid discharge unit and/or a current value of the discharge current flowing in the short-circuit path, in each case, are dependent upon battery cell chemistry and/or battery cell size.

Preferably, the duration of the first and/or second time interval and/or the time limit for the definition of the fourth time interval are dependent upon the battery cell size and/or upon at least one of the discharge currents described immediately heretofore and/or upon the properties of the at least one separator.

A further aspect of the invention relates to a method for the rapid discharge of an aforementioned battery cell, wherein a first and a second step are executed. The first step involves the identification of an aforementioned hazard situation, in which the battery cell is in a state in which the short-circuit path has appeared or might appear, or in which a high risk of the aforementioned critical behavior of the aforementioned battery cell is anticipated. The second step involves the switching-in of the rapid discharge unit between the two battery cell terminals, which are contactable from inside and/or outside the battery cell, in the presence of a hazard situation. The rapid discharge unit can be arranged either inside or outside the battery cell housing, and is electrically bonded with the two battery cell terminals. Preferably, switching-in occurs within the fourth predefined time interval.

A further aspect of the invention relates to a battery system having a battery with at least one aforementioned battery cell.

BRIEF DESCRIPTION OF THE DRAWINGS

An exemplary embodiment of the invention is described in detail hereinafter, with reference to the attached drawings. In each case, equivalent components and parameters are represented by the same reference symbols. Each component and each parameter is introduced once and, upon the repetition thereof, is deemed to have been explained, regardless of the drawing to which a corresponding descriptive section refers, in which the corresponding component or the corresponding parameter is repeated. In the drawings.

DETAILED DESCRIPTION

Figure 1:
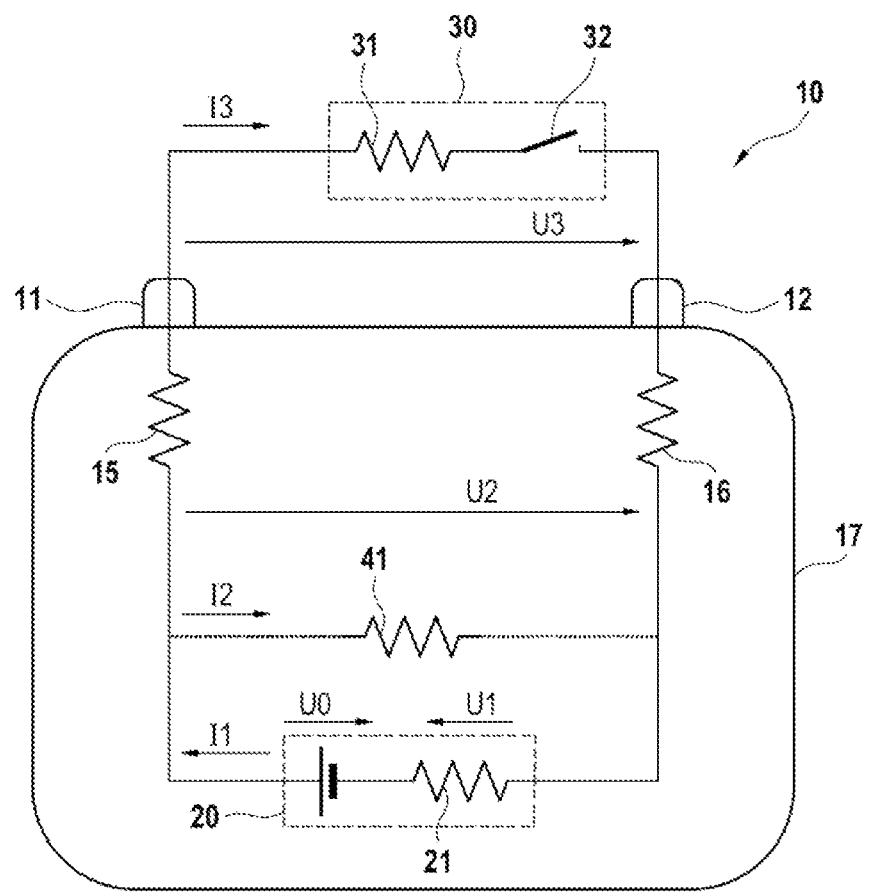
FIG. 1 shows a battery cell according to a first form of embodiment of the invention, wherein the battery cell has a rapid discharge unit and a short-circuit path.

FIG. 1 shows a battery cell 10 according to a first form of embodiment of the invention. The battery cell 10 comprises a first battery cell terminal 11 and a second battery cell terminal 12. The two battery cell terminals 11, 12 are contactable from inside and outside the battery cell 10. The battery cell 10 moreover comprises an electrochemical part 20 configured, for example, in the form of a jelly roll, and incorporating two foil-type electrodes (not represented separately). The electrochemical part 20 delivers a no-load voltage U0 for the battery cell 10, and has an internal resistance 21. The first battery cell terminal 11 is connected to a first electrode of the two electrodes. A connection between the first battery cell terminal 11 and the first electrode has a first resistance 15. The second battery cell terminal 12 is connected to a second electrode of the two electrodes. A connection between the second battery cell terminal 12 and the second electrode has a second resistance 16.

The battery cell 10 moreover comprises a separator (not represented separately) which, upon the achievement of a predefined temperature, becomes impermeable to the ions generated in the electrochemical part 20. If the separator achieves the predefined temperature, the at least partial deactivation thereof ensues as a result, in consequence whereof a current value of a discharge current generated by the battery cell 10 is reduced. The battery cell 10 also comprises a rapid discharge unit 30 which, in the schematic representation shown in FIG. 1, is represented as a combination of a third resistance 31 and a controllable switch 32. The resistance value of the third resistance 31 corresponds to a predefined resistance value of the activated rapid discharge unit 30. The switch 32 also represents an activation state of the rapid discharge unit 30. If the switch 32 is open, the rapid discharge unit 30 is not switched in between the two battery cell terminals 11, 12 and, in consequence, is not activated. If the switch 32 is closed, the rapid discharge unit 30 is switched-in between the two battery terminals 11, 12 and, in consequence, is also activated. The battery cell 10 comprises a control unit (not represented separately), which is designed for the control of the switch 32, i.e. for the opening and closing thereof. By the switching-in of the rapid discharge unit 30, a rapid discharge path is created, the route of which encompasses the rapid discharge unit 30 and the connections between the battery cell terminals 11, 12 and the electrodes. A resistance value of the rapid discharge path is dependent upon the predefined resistance value of at least the third resistance 31 of the rapid discharge unit 30, and upon a resistance value of the first and second resistances 15, 16 of the connections between the battery cell terminals 11, 12 and the electrodes. Alternatively to the form of execution described above, in which the rapid discharge unit 30 is arranged outside a battery cell housing 17 of the battery cell 10, the rapid discharge unit 30 can also be arranged inside the battery cell housing 17 and connected to the electrochemical part 20, or can be configured as part of the battery cell housing 17.

According to a first form of embodiment, the battery cell 10 is exposed to a hazard situation, which is generated by a safety test, during which a short-circuit path is formed in the interior of the battery cell 10. The short-circuit path is generated, for example, during the safety test by the penetration of the battery cell 10 with a nail. A resistance value of the short-circuit path is typically strongly dependent upon a resistance value of the foil-type electrodes, and weakly dependent upon a resistance value of the nail.

The predefined resistance value is selected such that, with the rapid discharge unit 30 switched-in, the separator achieves the predefined temperature, in the absence of the short-circuit path, within a predefined first time interval and, in the presence of a short-circuit path, within a predefined second time interval. The first and second time intervals commence respectively upon the switching-in of the rapid discharge unit 30, and end respectively upon the achievement of the predefined temperature.

Moreover, the predefined resistance value of the at least one resistance 31 is selected such that, in the absence of the short-circuit path and with the rapid discharge unit 30 switched-in, a first quantity of electrical energy undershoots a first energy limit. The first quantity of energy coincides with a quantity of energy which, in the absence of the short-circuit path and with the rapid discharge unit 30 switched-in, is converted into heat during a variable third time interval as a result of a discharge current flowing in the rapid discharge unit 30. The third time interval commences simultaneously with the first time interval, and has a maximum duration which is equal to or greater than the duration of the first time interval. The first energy limit is selected such that the overheating of the entire battery cell 10, thus initiating the thermal runaway of the battery cell 10, can only occur in the event of the overshoot thereof by the first quantity of energy.

If the rapid discharge unit 30, in the presence of the short-circuit path which is formed, for example, by the penetration of the battery cell 10 with a nail, or as a result of a battery cell defect or damage to the battery cell, is not switched-in, localized heat-up will occur in the region of the battery cell within which the short-circuit path is located. This localized heat-up is caused by a discharge current, which flows in the short-circuit path. This localized heat-up, notwithstanding the at least partial deactivation of the separator, can constitute a localized heat-up of the region of the battery cell, resulting in a temperature in said region of the battery cell which exceeds a critical temperature limit. An overshoot of the critical temperature limit can initiate the thermal runaway of the battery cell 10.

According to a first form of embodiment, the control unit is designed such that the rapid discharge unit 30, by the closing of the switch 32, is switched-in within a fourth predefined time interval. The fourth time interval commences immediately upon the penetration of the battery cell 10 by the nail, or upon the detection of other damage to the battery cell, or of an internal short-circuit in the battery cell. Moreover, the fourth time interval ends upon the switching-in of the rapid discharge unit 30.

In FIG. 1, I1 represents a first discharge current which is generated by the battery cell 10 in the presence of the short-circuit path and with the rapid discharge unit 30 switched-in. Moreover, I2 represents a second discharge current, which flows in the short-circuit path in the event of the presence of the short-circuit path and with the rapid discharge unit 30 switched-in. I3 represents a third discharge current, which flows in the rapid discharge unit 30 in the presence of the short-circuit path and with the rapid discharge unit 30 switched in. The first discharge current I1 is equal to the sum of the second discharge current I2 and the third discharge current I3.

According to a first form of embodiment, the electrochemical part 20 is configured and the battery cell 10 is preferably dimensioned such that a second and third quantity of electrical energy respectively undershoot a second energy limit. Moreover, the electrochemical part 20 is configured and the battery cell 10 is preferably dimensioned such that a sum of the second and third quantities of energy also undershoots a third energy limit. The second and third quantities of energy, and the sum thereof, thus undershoot the corresponding energy limit if, in the presence of the short-circuit path, the duration of the fourth time interval undershoots a time limit, and the predefined resistance value of the at least one resistance 31 undershoots a limiting resistance value. The second quantity of energy coincides with a quantity of energy which, in the presence of a short-circuit path and with the rapid discharge unit 30 switched-in, as a result of the second discharge current I2 flowing in the short-circuit path during a variable fifth time interval, is converted into heat. The third quantity of energy coincides with a quantity of energy which, in the presence of a short-circuit path and with the rapid discharge unit 30 switched-in, as a result of a third discharge current I3 flowing in the rapid discharge unit 30 during the fifth time interval, is converted into heat. The fifth time interval commences simultaneously with the second time interval, and has a maximum duration which is equal to or greater than the duration of the second time interval. Moreover, the second energy limit is selected such that localized heat-up in the region of the battery cell within which the short-circuit path is located, thus initiating the thermal runaway of the battery cell 10, can only occur in the event of the overshoot thereof by the second quantity of energy and/or the third quantity of energy. Moreover, the third energy limit is selected such that the overheating of the entire battery cell 10, thus initiating the thermal runaway of the battery cell 10, can only occur in the event of the overshoot thereof by the sum of the second and third quantities of energy.

The first energy limit, the second energy limit and the third energy limit are respectively dependent upon the battery cell chemistry of the battery cell 10.

One mode of operation of the battery cell 10 is explained hereinafter, with reference to a voltage-based first calculation model and a current-based second calculation model.

According to the first calculation model, the no-load voltage U0 is dependent upon a state of charge of the battery cell 10. Moreover, the internal resistance 21 of the electrochemical part 20 shows a time-dependent resistance value.

According to the second calculation mode, the maximum discharge current which can be generated by the battery cell 10, also described as the maximum discharge current, shows a time-dependent current value, which is moreover dependent upon the battery cell chemistry, and preferably also upon the battery cell size of the battery cell 10. Moreover, the internal resistance 21 of the electrochemical part 20 shows a time-dependent resistance value, which is also dependent upon the current value of the maximum discharge current.

According to each calculation model, the switching-in of the rapid discharge unit 30, in the absence of the short-circuit path, results in the occurrence of the third discharge current I3 flowing in the rapid discharge unit 30. This results in the occurrence of a voltage drop across each of the connections between the battery cell terminals 11, 12 and the electrodes. This results, in turn, in the occurrence of a terminal voltage, which is applied between the two voltage terminals 11, 12 by the electrochemical part 20, and which is distinguished from the no-load voltage U0.

According to the first calculation model, in the presence of the short-circuit path and with the rapid discharge unit 30 switched-in, a higher current value of the third discharge current I3 flowing in the rapid discharge unit 30 results in a higher voltage value of a first voltage U1 measured across the internal resistance 21 of the electrochemical part 20. This, in turn, results in a reduced voltage value of a second voltage U2 across the short-circuit path. This, in turn, results in a reduced current value of the second discharge current I2, and consequently in the reduced localized heat-up of the region of the battery cell within which the short-circuit path is located, which is primarily caused by the second discharge current I2. In FIG. 1, U3 represents a third voltage, which is present across the rapid discharge unit 30, in the presence of the short-circuit path and with the rapid discharge unit 30 switched-in.

According to the second calculation model, in the absence of the short-circuit path and with the rapid discharge 30 unit switched-in, the discharge current flowing in the rapid discharge unit 30 is equal to the maximum discharge current. In this case, the previously defined first quantity of energy coincides with a quantity of electrical energy which, as a result of the maximum discharge current flowing in the rapid discharge unit 30, is converted into heat during the third variable time interval.

According to the second calculation model, in the presence of the short-circuit path and with the rapid discharge unit 30 switched-in, the first discharge current I1 is equal to the maximum discharge current. By the switching-in of the rapid discharge unit 30 in the presence of the short-circuit path, the rapid discharge path routed through the rapid discharge unit 30 is switched in parallel with the short-circuit path. If the rapid discharge path 30 is switched in parallel with the short-circuit path, the maximum discharge current is equal to the sum of the second discharge current I2 flowing in the short-circuit path and the third discharge current I3 flowing in the rapid discharge unit 30. Moreover, the maximum discharge current is divided between the short-circuit path and the rapid discharge path, in accordance with a relative quotient of the resistance values of the two paths. According to the second calculation model, the switching-in of the rapid discharge unit 30, in the presence of the short-circuit path, results in a high current value of the third discharge current I3. This results, in turn, in a reduced current value of the second discharge current I2 and, consequently, a reduction in the localized heat-up of the region of the battery cell within which the short-circuit path is located, which is primarily caused by the second discharge current I2. If this localized heat-up results in a temperature in this region of the battery cell which undershoots the critical temperature limit, the thermal runaway of the battery cell 10 can be prevented.

Figure 2:
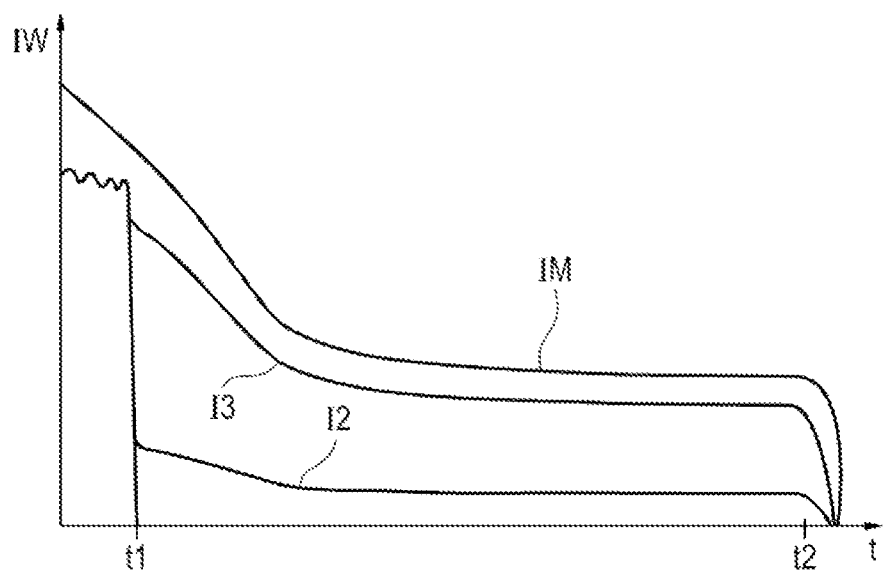
FIG. 2 shows a time-dependent characteristic of a first discharge current, which is equal to the maximum discharge current which can be generated by the battery cell, a time-dependent characteristic of a second discharge current flowing in the short-circuit path, and a time-dependent characteristic of a third discharge current flowing through the rapid discharge unit.
Figure 3:
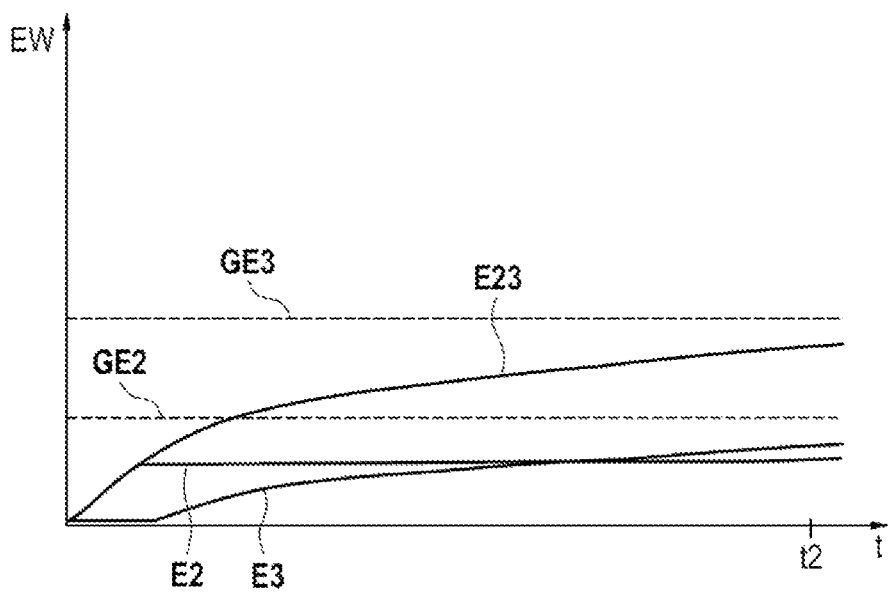
FIG. 3 shows a time-dependent characteristic of a second quantity of energy which, as a result of the second discharge current, is converted into heat, a time-dependent characteristic of a third quantity of energy which, as a result of the third discharge current, is converted into heat, and a time-dependent characteristic of the sum of the second and third quantities of energy.

FIG. 2 shows a characteristic of the previously-defined first discharge current I1, a characteristic of the previously-defined second discharge current I2 flowing in the short-circuit path, and a characteristic of the previously-defined third discharge current I3 flowing in the rapid discharge unit 30, in each case in relation to the previously-defined fifth variable time interval. In this case, after the switching-in of the rapid discharge unit, the first discharge current I1 is equal to the maximum discharge current IM, and the maximum discharge current IM is equal to the sum of the second discharge current I2 and the third discharge current I3. In FIG. 3, t1 represents the duration of the previously-defined fourth time interval. FIG. 3 shows a characteristic of the previously-defined second quantity of energy E2, a characteristic of the previously-defined third quantity of energy E3, and a characteristic of the sum E23 of the second quantity of energy E2 and the third quantity of energy E3, in each case in relation to the fifth variable time interval. The characteristics represented in FIG. 3 will occur in the presence of the characteristics represented in FIG. 2. The characteristics represented in FIGS. 2 and 3 are defined in each case by the application of the second calculation model. The characteristics represented in FIGS. 2 and 3 will occur, if the duration t1 of the fourth time interval undershoots the previously-defined time limit, and the predefined resistance of the at least one third resistance 31 undershoots the previously-defined limiting resistance value. FIG. 2 also represents a characteristic of the second discharge current I2. It can be seen from FIG. 2 that the second discharge current I2, prior to the switching-in of the rapid discharge unit, shows high current values, and assumes significantly lower current values immediately after the switching-in of the rapid discharge unit 30. From FIG. 2, it can also be seen that each of the first, second and third discharge currents I1, I2, I3, after the end of the second time interval, very rapidly assumes a current value close to 0 A. FIG. 3 also represents the previously-defined second energy limit GE2 and the previously-defined third energy limit GE3. From FIG. 3, it can be seen that both the second quantity of energy E2 and the third quantity of energy E3 undershoot the second energy limit GE2 at any time point within the second time interval. In FIGS. 2 and 3, the duration of the second time interval is represented by tz. From FIG. 3, it can also be seen the sum E23 of the second quantity of energy E2 and the third quantity of energy E3 undershoots the third energy limit GE3 at any time point within the second time interval. The thermal runaway of the battery cell 10 is prevented accordingly. In FIG. 2, current values are shown on the axis marked IW. In FIG. 3, quantities of energy are shown on the axis marked EW. In FIGS. 2 and 3, time is shown on the axis marked t.

In each case, the absence of the rapid discharge unit 30 and an overshoot of the time limit and/or of the limiting resistance value would result in an overshoot of the second energy limit GE2 by the second quantity of energy E2 within the second time interval, Moreover, an inappropriate selection of battery cell properties, even in the event of the undershoot of the time limit and the limiting resistance value, would lead to an overshoot of the second energy limit GE2 by the third quantity of energy E3, and preferably also by the second quantity of energy E2, within the second time interval. The battery cell properties encompass the battery cell chemistry, and preferably the battery cell size. Thus, the inappropriate selection of battery cell properties, even in the event of the undershoot of the time limit and the limiting resistance value, might also lead to an overshoot of the third energy limit GE3 by the sum E23 of the second quantity of energy E2 and the third quantity of energy E3 within the second time interval. In this case, it should be considered that the current value of the maximum discharge current IM is dependent upon the aforementioned battery cell properties. It should moreover be considered that the gradient of the characteristic of the second discharge current I2 and the characteristic of the third discharge current I3, and consequently also the gradient of the characteristic of the second quantity of energy E2 and the characteristic of the third quantity of energy E3, are respectively dependent upon the battery cell chemistry. Consequently, by an appropriate selection of battery cell chemistry, the aforementioned gradients can be set such that the second quantity of energy E2 and the third quantity of energy E3 each undershoot the second energy limit GE2, and the sum thereof E23 undershoots the third energy limit GE3. Each gradient is to be understood here as the first deviation of the corresponding characteristic over time.

All the overshoots listed heretofore with reference to FIG. 3 would occur within the second time interval, i.e. before the at least partial deactivation of the separator, and would consequently initiate the thermal runaway of the battery cell 10 in each case.

Factors are described hereinafter which, in the application of the second calculation model, will result in a reduction of the probability of the initiation of the thermal runaway of the battery cell 10.

A reduction of the aforementioned probability can be achieved by the exercise of an influence upon the current value of the maximum discharge current IM. This influence can be achieved by the appropriate selection of an electrolyte and of active materials which are employed in the electrochemical part 20 of the battery cell 10. This influence can moreover by achieved by the appropriate selection of the battery cell size, and by the use of appropriate active layers in the electrochemical part 20 for the limitation of the current value of the maximum discharge current IM.

In the presence of the short-circuit path and with the rapid discharge unit 30 switched-in, a reduction of the aforementioned probability can moreover be achieved by a reduction in the current value of the second discharge current I2 flowing in the short-circuit path and/or by cooling. This reduction can be achieved by an increase in the resistance value of the short-circuit path, and specifically by an increase in the resistance value of the foil-type electrodes.

In the presence of the short-circuit path and with the rapid discharge unit 30 switched-in, a reduction of the aforementioned probability can also be achieved by an increase in the current value of the third discharge current I3 flowing in the rapid discharge path. This increase can be achieved by a reduction in the resistance value of the rapid discharge path, specifically by the reduction of the resistance value of the first and second resistances 15, 16 of the connections between the battery cell terminals 11, 12 and the electrodes.

A reduction of the aforementioned probability can also be achieved by the exercise of an influence upon the first energy limit, the second energy limit GE2 and the third energy limit GE3. This influence can also be achieved by a change in the active materials and the separator which are employed in the electrochemical part 20.

In addition to the written disclosure set out above, the representation shown in FIGS. 1 to 3 is also to be considered for the further disclosure of the invention.

The invention claimed is:

1. A battery cell (10) comprising:
two battery cell terminals (11, 12) which are contactable from inside, outside, or from both inside and outside the battery cell (10),
an electrochemical part (20) including a plurality of electrodes and at least one separator wherein, upon the achievement of a predefined temperature, the at least one separator is at least partially impermeable to ions which can be generated in the electrochemical part (20), and
a rapid discharge unit (30) which is connectable between the battery cell terminals (11, 12) and has a predefined resistance value which is selected such that, when the rapid discharge unit (30) is brought into circuit, the at least one separator achieves the predefined temperature in the absence of a short-circuit path in the interior of the battery cell (10) within a predefined first time interval, in the presence of a short-circuit path in the interior of the battery cell, within a predefined second time interval, or both,
wherein the first and second time intervals commence respectively upon the switching-in of the rapid discharge unit (30), and end respectively upon the achievement of the predefined temperature.

2. The battery cell according to claim 1, wherein the predefined resistance value is selected such that, in the absence of the short-circuit path, a first quantity of electrical energy which, as a result of a discharge current flowing through the rapid discharge unit (30) during a variable third time interval, is converted into heat, undershoots a first energy limit, wherein the third time interval commences simultaneously with the first time interval, and has a maximum duration which is equal to or greater than the duration of the first time interval.

3. The battery cell (10) according to claim 1, further comprising a control unit designed to switch-in the rapid discharge unit (30) between the battery terminals (11, 12) within a fourth predefined time interval, wherein the fourth time interval commences immediately after the detection of a hazard situation, in which a short-circuit path has appeared or might appear in the interior of the battery cell (10), or in which a high risk of an aforementioned critical behavior by the battery cell (10) is anticipated, and ends upon the switching-in of the rapid discharge unit (30).

4. The battery cell (10) according to claim 3, wherein the hazard situation occurs during a safety test of the battery cell (10), or during the operation of the battery cell (10).

5. The battery cell (10) according to claim 4, wherein a short-circuit path is formed in the interior of the battery cell (10) during the safety test by the penetration of the battery cell (10) with a nail.

6. The battery cell (10) according to claim 3, wherein the electrochemical part (20) is configured and the battery cell (10) is dimensioned such that, in the presence of a short-circuit path, the duration (t1) of the fourth time interval undershoots a time limit and the predefined resistance value undershoots a limiting value for resistance, a second quantity of electrical energy (E2) which, as a result of a discharge current (I2) flowing in the short-circuit path during a variable fifth time interval, is converted into heat, and a third quantity of electrical energy (E3) which, as a result of a discharge current (I3) flowing in the rapid discharge unit (30) during the fifth time interval, is converted into heat, respectively undershoot a second energy limit (E2) or a sum (E23) of the second quantity of energy (E2) and the third quantity of energy (E3) undershoot a third energy limit (GE3), wherein the fifth time interval commences simultaneously with the second time interval, and has a maximum duration which is equal to or greater than the duration (t2) of the second time interval.

7. The battery cell (10) according to claim 6, wherein the second energy limit (GE2) is lower than the third energy limit (GE3), the third energy limit (GE3) is equal to or lower than the first energy limit, or both.

8. A method for the rapid discharge of a battery cell (10) according to claim 1, further comprising:
identifying a hazard situation, in which the battery cell (10) is in a state in which a predetermined risk threshold of a short-circuit path appearing in the interior of the battery cell (10) has been met or exceed, and
switching-in the rapid discharge unit (30) between the two battery cell terminals (11, 12), when a hazard situation has been identified.

9. A battery system with a battery (10) having at least one battery cell comprising:
- two battery cell terminals (11, 12) which are contactable from inside, outside, or from both inside and outside the battery cell (10),
- an electrochemical part (20) including a plurality of electrodes and at least one separator wherein, upon the achievement of a predefined temperature, the at least one separator is at least partially impermeable to ions which can be generated in the electrochemical part (20), and
- a rapid discharge unit (30) which is connectable between the battery cell terminals (11, 12) and has a predefined resistance value which is selected such that, when the rapid discharge unit (30) is brought into circuit, the at least one separator achieves the predefined temperature
- in the absence of a short-circuit path in the interior of the battery cell (10) within a predefined first time interval,
- in the presence of a short-circuit path in the interior of the battery cell, within a predefined second time interval, or both, wherein the first and second time intervals commence respectively upon the switching-in of the rapid discharge unit (30), and end respectively upon the achievement of the predefined temperature.

* * * * *